(No Model.) 4 Sheets—Sheet 1.
W. S. OSBORN.
CORN HARVESTER.
No. 526,197. Patented Sept. 18, 1894.
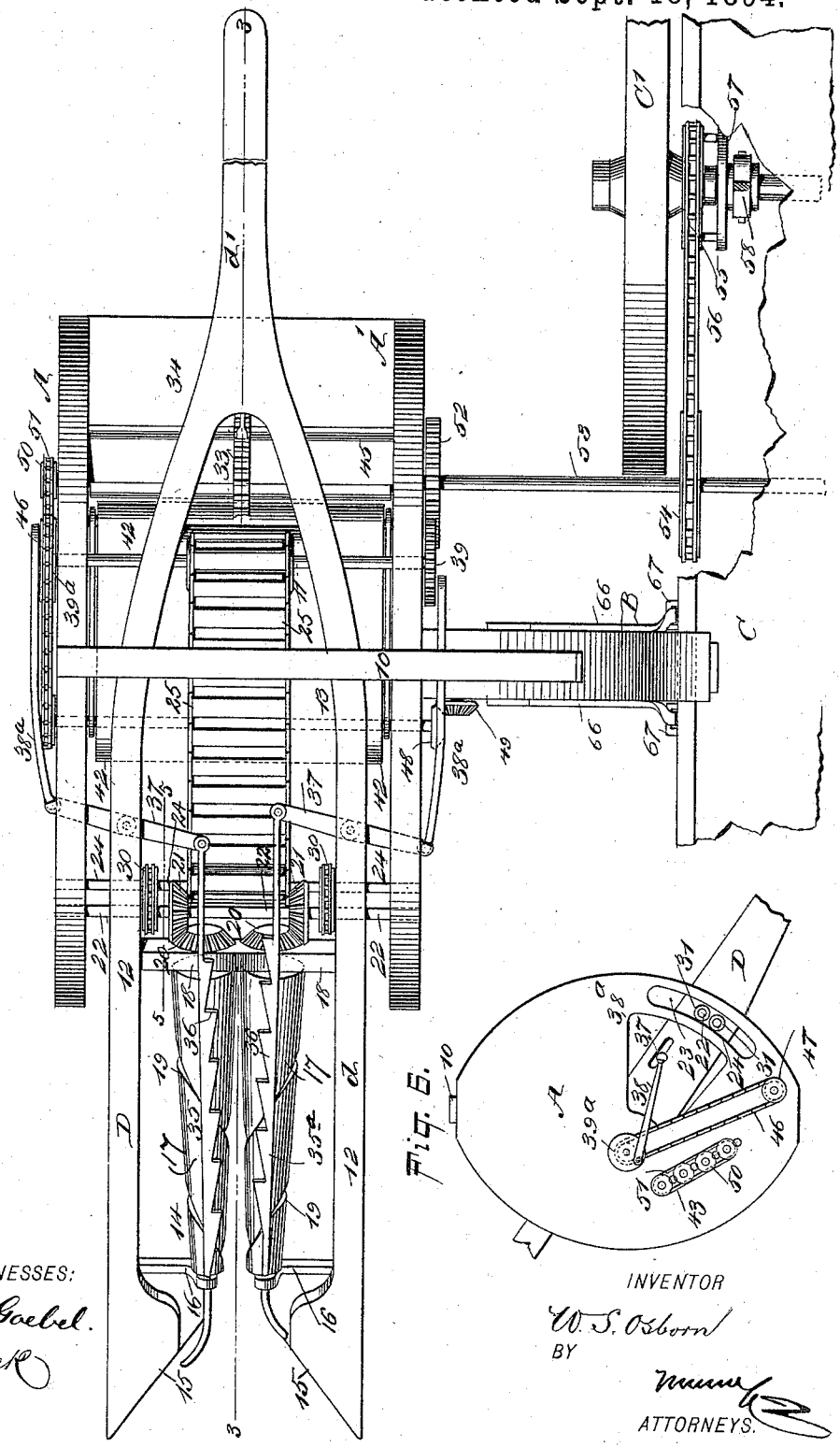
WITNESSES:
William Goebel.
C. Sedgwick
INVENTOR
W. S. Osborn
BY
ATTORNEYS.

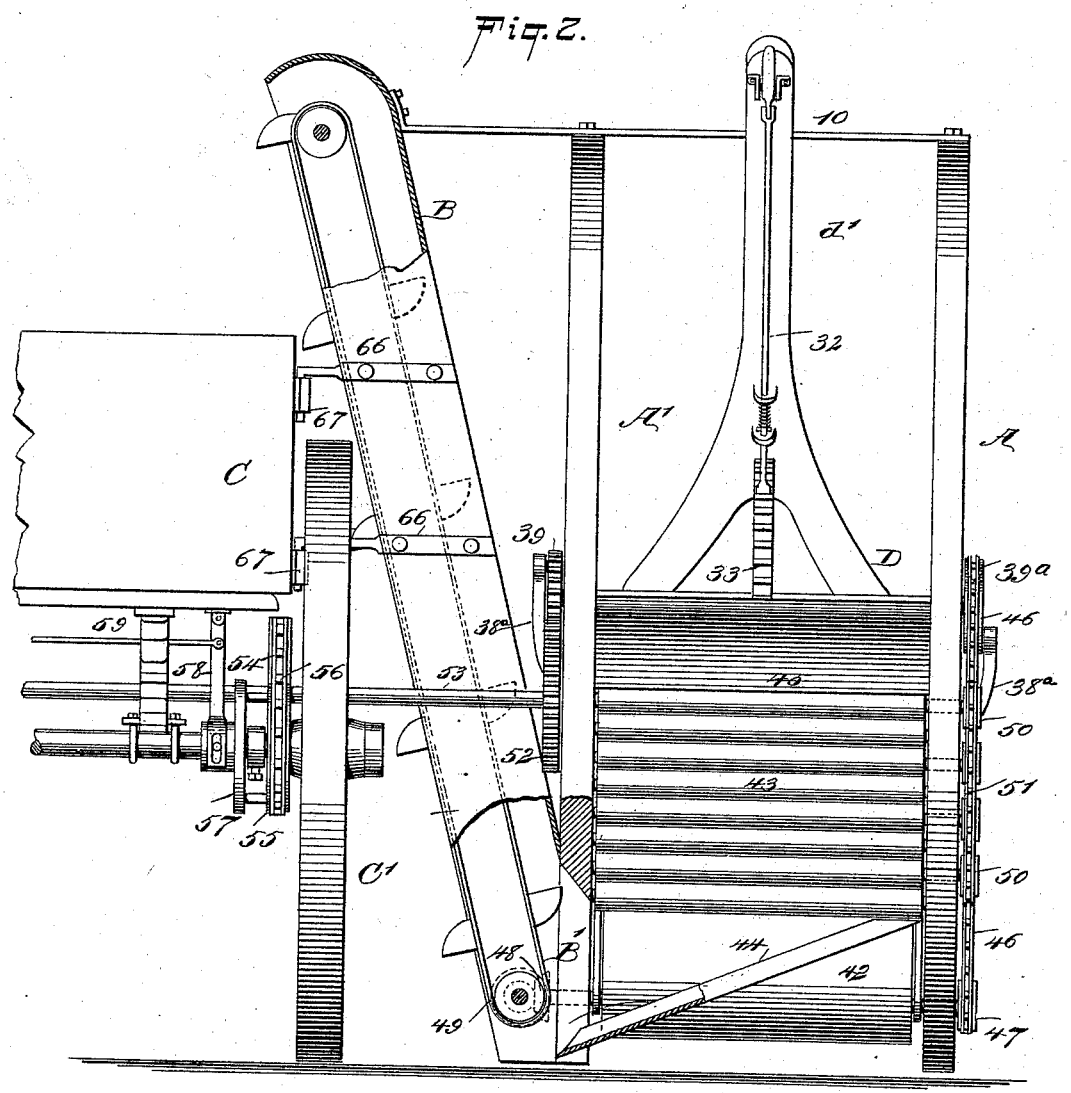

(No Model.) 4 Sheets—Sheet 3.
W. S. OSBORN.
CORN HARVESTER.
No. 526,197. Patented Sept. 18, 1894.
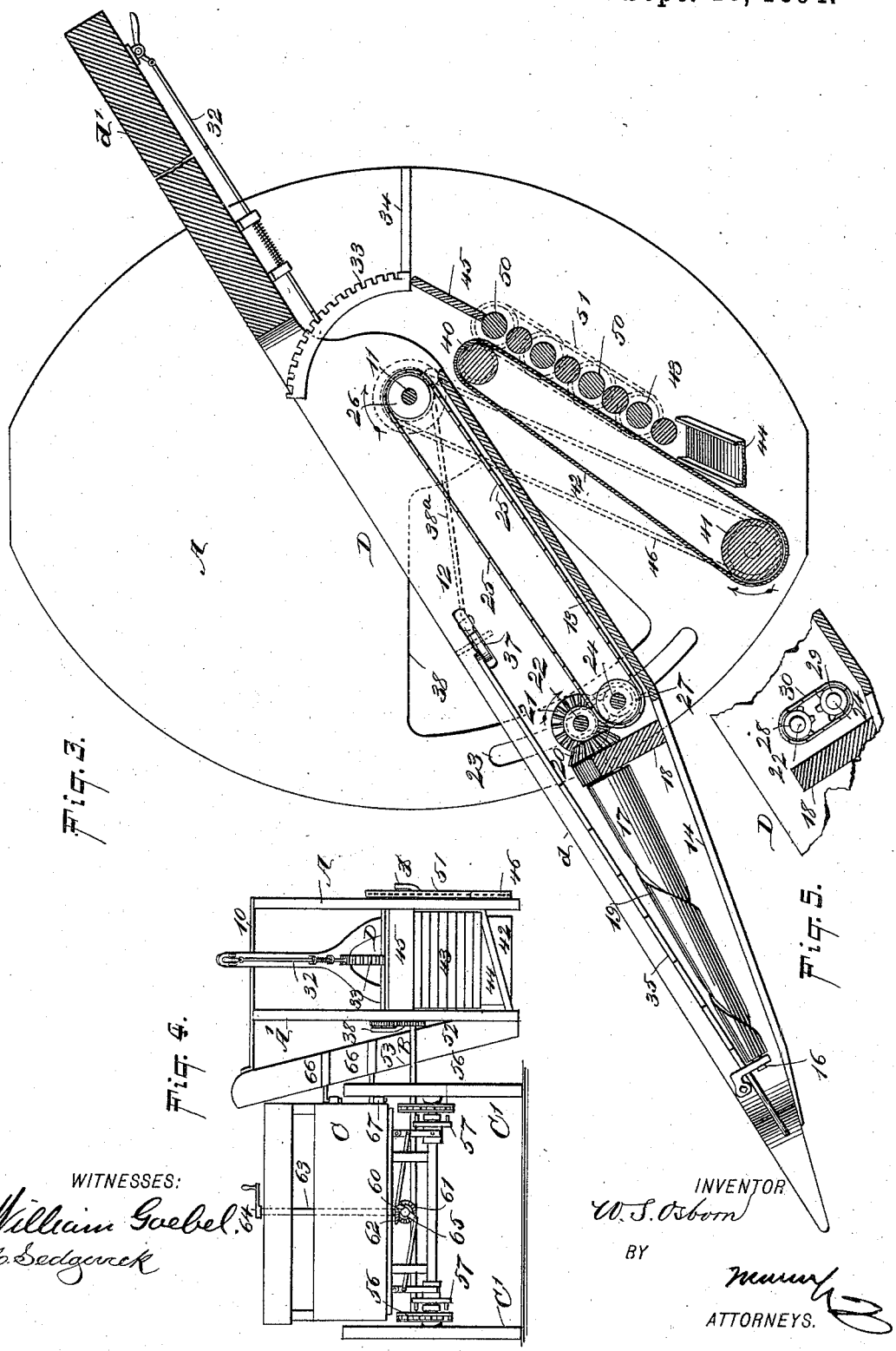
WITNESSES:
William Goebel
C. Sedgwick
INVENTOR
W. S. Osborn
BY
Munn
ATTORNEYS.

(No Model.) 4 Sheets—Sheet 4.
W. S. OSBORN.
CORN HARVESTER.
No. 526,197. Patented Sept. 18, 1894.
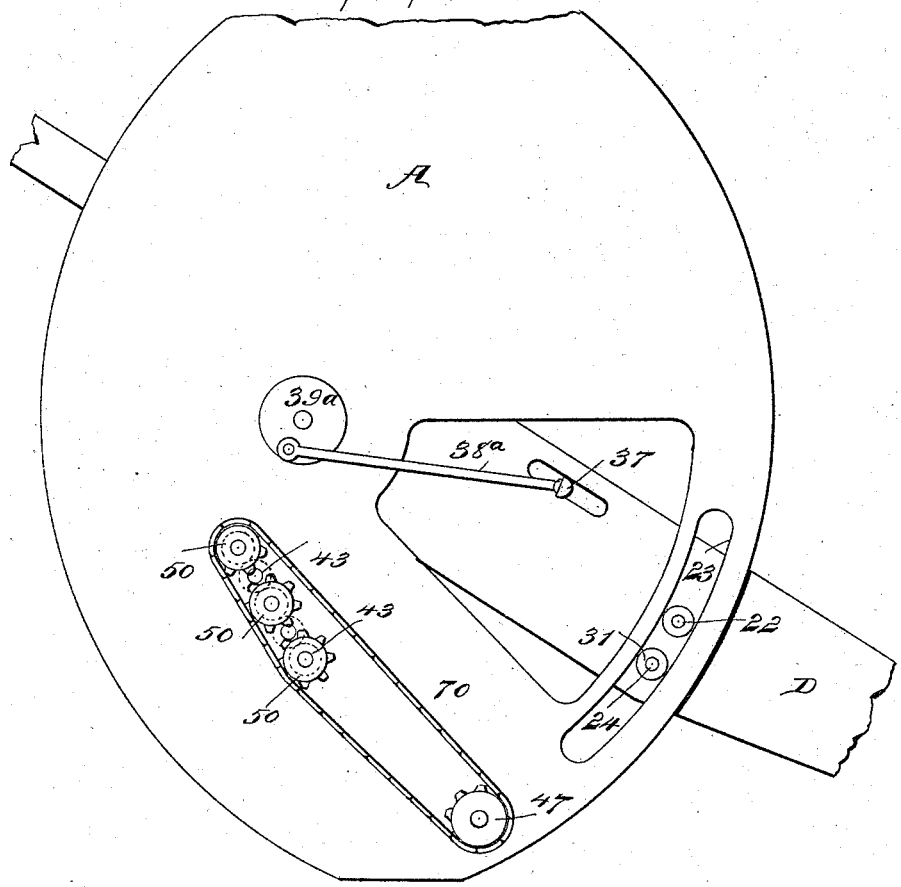
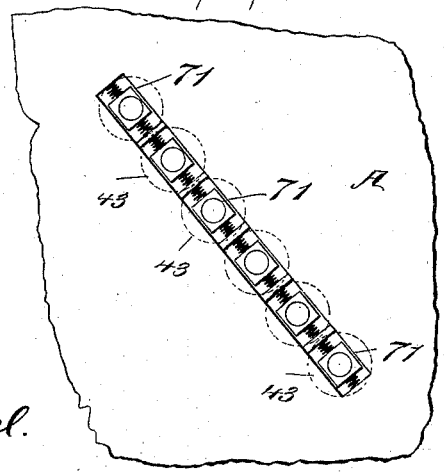
WITNESSES:
William Goebel.
C. Sedgwick.
INVENTOR
W. S. Osborn
BY
Munn
ATTORNEYS.

UNITED STATES PATENT OFFICE.

WINFIELD S. OSBORN, OF GILBOA, INDIANA.

CORN-HARVESTER.

SPECIFICATION forming part of Letters Patent No. 526,197, dated September 18, 1894.

Application filed March 1, 1894. Serial No. 501,981. (No model.)

*To all whom it may concern:*

Be it known that I, WINFIELD S. OSBORN, of Gilboa township, in the county of Benton and State of Indiana, have invented a new and Improved Corn-Harvester, of which the following is a full, clear, and exact description.

My invention relates to an improvement in corn harvesters, and it has for its object to provide a harvester of exceedingly simple and durable construction and capable of attachment in an expeditious and convenient manner to the box body of any wagon, the harvester being so constructed that as it is advanced along a row of corn the ears will be stripped from the stalks of corn and delivered at the rear of the harvester, at which point the ears will be stripped of their husks and silk, and whereby further, the husked ears of corn will be delivered from the husking apparatus to an elevator, through the medium of which they will be conveyed to the box of the wagon.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a plan view of the corn harvester, illustrating its application to the body of a wagon. Fig. 2 is a rear elevation of the harvester partially in section, and likewise a partial rear elevation of the wagon to which the harvester is attached. Fig. 3 is a longitudinal central vertical section through the harvester, taken essentially on the line 3—3 of Fig. 1. Fig. 4 is a rear elevation of the harvester and the wagon to which the harvester is attached, said view being made upon a smaller scale than Fig. 2. Fig. 5 is a detail section taken on the line 5—5 of Fig. 1. Fig. 6 is a side elevation of the outer side of the main portion of the harvester. Fig. 7 is a partial side elevation of the harvester, illustrating a slight modification in the driving mechanism; and Fig. 8 illustrates the arrangement of spring bearings for the shucking rollers.

In carrying out the invention, the body of the harvester consists of two side pieces A and A', the said side pieces being more or less elliptical in general contour, and they are tied together at the top by a cross bar 10, which extends beyond the side piece A', which is to be the inner one, and the said cross bar at its projecting end is made fast in any suitable or approved manner to the upper portion of an elevator B, the lower portion of the elevator having communication with the space between the side pieces A and A' of the frame through an opening B' in the bottom of the inner side piece A', as is best shown in Fig. 2.

The elevator may be of any suitable or approved type, and is of such height and inclination that its upper or delivery end will extend over the wagon bed or body C, with which the harvester is to be connected. An axle 11, is passed through the side pieces A and A' of the frame at a point about centrally between their upper and lower edges, and preferably at a point rearward of the center, whereby the said shaft is eccentrically placed. The shaft 11, is adapted to serve as a fulcrum for what may be termed the working frame D of the machine. This working frame consists of a box body $d$, and a rearwardly-extending stem or arm $d'$. The box body comprises opposing side sections 12 and a floor 13, the said floor at the forward end of the box section being provided with a longitudinal slot or opening 14, and at each side of the said opening at the forward end of the box body the inner surfaces of the said box body are made more or less tapering, as shown at 15 in Fig. 1, whereby the corn stalks will be directed to the mouth of the opening 14. The floor of the box body is preferably made to incline from its center in opposite directions, the central portion of the bottom being preferably the depressed portion, as illustrated in Fig. 3; and the front portion of the box body is the narrowest portion, being even narrower than the rear. The rear end of the box body of the working frame is open and the upper portions of the sides 12 of the said body section are usually carried together at the rear to form the arm section $d'$, which is centrally located with respect to the body.

A bearing 16, is located one at each side of the mouth or entrance to the slot 14 in the working frame; in fact, two bearings 16 and 16ª are located at each side of the mouth of said slot, one above the other. In the lower of these bearings 16, the outer or forward ends of rollers 17 are journaled, the inner ends of said rollers being journaled in a partition 18, which extends transversely across the floor of the box body, usually at or near the rear or inner end of the slot 14; and preferably a V-recess or depression is made in the upper edge of this partition, as shown in Fig. 1, at its central portion or that portion which is located between the rollers. The rollers 17, are conical in longitudinal formation, their smaller ends being their outer ends; and each roller is provided with a spiral groove or rib 19, the rollers being adapted to turn in direction toward each other.

In locating the rollers their larger or inner ends are placed substantially in contact, while their smaller or outer ends are placed a predetermined distance apart. Thus the space between the rollers diminishes as it extends inward, being entirely closed near the inner ends of the rollers. The trunnions at the inner ends of the rollers are made to extend through and beyond the partition 18, each trunnion being provided with a beveled gear 20, said gears being driven by like gears 21 located on a shaft 22, journaled in the sides of the box section of the working frame, as shown in Figs. 1 and 3, which shaft extends through and beyond the sides of the body sections of the body frame into segmental slots 23 produced in the sides A and A' of the main or stationary frame, the said slots being located near the front lower portion of said sides, as shown in Figs. 3 and 6.

Practically below the shaft 22 a second and parallel shaft 24, is journaled in the box body, which shaft likewise extends through into the slots 23 of the slides of the main frame. The lower shaft 24, is driven from the shaft 11 by means of a belt 25, which is of sufficient width to be a conveyer, said belt being made to pass over a pulley or drum 26, located upon the shaft 11 and over a like pulley 27 located about centrally on the shaft 24. This belt is immediately in front of the depression in the central portion of the partition 18, and is also in front of the delivery end of the rollers 17.

The two shafts 22 and 24, are driven one from the other through the medium of sprocket wheels 28 and 29, shown in Fig. 5, located upon said shafts near the side walls of the box body, the said sprocket wheels being connected by chain belts 30 or their equivalents. Preferably the outer ends of the shafts 22 and 24 where they pass through the slots 23 in the main frame, are provided with friction rollers 31, loosely mounted upon them, forming rolling bearings therefor as shown in Fig. 6, as the shafts serve in a measure to support the forward end of the working frame D and remove the weight of the frame from the upper shaft 11.

The shaft 11 is located just above the rear end of the bottom of the working frame. The working frame may be raised and lowered therefore, to carry its forward end to or from the surface over which the harvester is to be drawn, and it is held in desired position by the engagement of a lever-controlled pawl 32, located upon the back of the rear arm or extension of the working frame, as shown in Fig 2, said pawl being held normally in engagement with a rack 33, extending up into the rear open portion of the working frame, as illustrated in Fig. 3, the rack being attached in any approved manner to the sides of the main frame, as for example, through the medium of a platform 34.

The rollers 17, are adapted to receive between them the standing corn stalks and to gradually draw said stalks downward between them as the machine is advanced, in order that the ears of corn may be held at the top of the rollers, while they are stripped from the stalk through the medium of strippers 35 and 35$^a$, located one over each roller 17, as shown in Fig. 1. These strippers consist of bars inclined upwardly from the front to the rear, and provided with teeth upon their inner faces. Each of the teeth has two edges, a front edge which is oblique to the longitudinal axis of the bar, and extends upward, and a rear edge which is essentially perpendicular to the longitudinal axis of the bar, and extends approximately horizontally. The lower ends of the strippers 35 and 35$^a$ have sliding movement in the upper one of the sets of bearings 16 heretofore alluded to, and are adapted to longitudinally reciprocate over the rollers. These strippers may be placed closer together at their lower than at their upper ends, or they may be placed parallel. The strippers are adapted to have movement simultaneously, but in opposite directions, and this is preferably accomplished by pivoting levers 37 in the sides of the box body of the working frame D, as shown in Fig. 1, the said levers being fulcrumed at or near their centers, and the inner ends of the levers are pivotally connected with the upper or inner ends of the strippers, and the outer portions of the levers are of sufficient length to extend through openings 38 made in the sides A and A' of the main frame, the outer ends of the levers being pivotally connected with pitmen 38$^a$, and the said pitmen are eccentrically and pivotally connected one with a gear 39 and the other with a pulley 39$^a$ secured upon the outer ends of the shaft 11, the connection of one pitman with the gear 39 being opposite to the point of connection of the opposing pitman with the pulley 39$^a$.

The forward ends of the strippers 35 and 35$^a$ are preferably curved outwardly or in opposite directions over the mouth of the working frame D, as shown in Fig. 1. Thus in the operation of the harvester, as the corn stalks are caught and retained between the rollers 17, the strippers remove the ears of corn and carry them to the upper portion of the box body of the working frame, at which point they are received by the conveyer belt 25 and conducted to the upper open end of the said box body, as is clearly shown in Fig. 3. Immediately beneath the open upper end of the box body a drum 40, is journaled between the two sides A and A' of the main frame; while a larger drum 41 is located farther toward the front between the forward lower portions of the said sides. These two drums carry an endless belt 42 of sufficient width to extend from one side A to the opposite side A' of the main frame. Back of the rear stretch of the endless belt 42 a series of husking rollers 43, is journaled in the sides of the main frame, as is shown in both Figs. 2 and 3. These rollers are parallel with the belt and are arranged one above the other, and the faces of the rollers may be either smooth or roughened, as may be found most convenient in practice.

Beneath the lower of the husking rollers 43 a chute 44, is placed, which extends from the side A of the main frame downwardly into the bottom of the opening B' of the opposite side A' of said frame as shown in Fig. 2. This chute receives the husked corn and delivers it to the buckets or other carriers of the elevator B. Above the upper roller of the series 43 a backboard 45, is placed, in order that the corn falling from the box body of the working frame will be compelled to drop between the endless apron 42 and the upper of the series of husking rollers 43; whereupon, as the ears of corn pass down the series of husking rollers, the husks will be stripped off therefrom and likewise the silk, and the husks and silk will pass out between the rollers, dropping at the rear of the machine upon the ground, while the cleaned ears of corn will drop into the chute 44, as heretofore stated.

It may here be remarked that the endless apron 42, acting in conjunction with the husking rollers, is driven from the shaft 11 by passing a belt 46 over the pulley 39ª at the outer side of the main frame and over a second pulley 47, located upon the outer end of the trunnion or axle upon which the lower drum 41 of said belt or apron 42 is mounted, as illustrated in Figs. 2, 3 and 6. The opposite trunnion or opposite end of the said drum 41 is provided at its outer end with a beveled gear 48, or the equivalent thereof, which is adapted to mesh with an equivalent gear 49, located upon the lower drum of the elevator. Thus it will be observed that the shaft 11 serves to drive the apron 42, likewise the elevator, as well as the receiving and stripping mechanism of the machine. The trunnions of the upper of the series of husking rollers 43, extend through both side pieces A and A' of the main frame of the harvester.

As shown in Fig. 6, and in dotted lines in Fig. 3, the trunnions passing through the outer sides A of the main frame, upon four of the husking rollers, are provided with pulleys 50, the said pulleys being located upon each alternate roller, the upper pulley being located upon the trunnion of the upper roller, and all of these pulleys are engaged by an endless belt 51, while at the opposite end, that is, what may be termed the inner trunnion or inner end of the shaft of the upper roller, a gear 52, is secured, which gear is made to mesh with the pitman gear 39, located upon the inner end of the shaft 11. The upper husking roller is preferably secured upon a shaft designated as 53 and shown in Fig. 1, and the said shaft extends quite a distance beyond the inner side of the main frame, the length of the extension of the shaft 53 being sufficient to permit it to extend beneath the wagon body C, as shown in Fig. 2, adjacent to the rear axle from side to side of the running gear.

Two driving pulleys 54, are located upon the extension of the shaft 53 in such manner that one pulley will be brought over the inner portion of the hub of each rear supporting wheel C' of the wagon. Only one of the driving pulleys 54 is shown in the drawings, and a driving pulley 55, is secured to the inner face of the hub of each rear wheel C', the said pulleys 54 and 55 being connected by a belt 56; but it will be understood that if in practice it is found desirable gearing may be substituted for the belts and pulleys.

Each wheel pulley 55, is provided with a clutch face adapted to be engaged by a clutch 57, held to slide upon the rear axle of the wagon, and each clutch is connected with a shifting fork 58, which is preferably pivoted to a bolster of the wagon, and both of the shifting forks have pivotally attached to them a link 59, said links being pivoted one at each end of a lever 60, shown in Fig. 4, which lever is actuated by a gear 61, meshing with a gear 62, attached to a shaft 63, operated for example by a crank arm 64, and located adjacent to the driver's seat, it being understood that a suitable shaft connection will be maintained between the shaft 63 and the lever 60, as for example, a gear 61 will be mounted upon a shaft 65, which will carry at one end the gear 61 and have attached to it at the opposite end the lever 60. Thus by turning the shaft 63, the clutches 57, which turn with the axle of the wagon, will be carried in or out of engagement with the driving pulleys 55, and the harvester will be set in motion, or quieted.

In Fig. 7, I have illustrated a modification in the driving mechanism for the shucking or husking rollers, the endless apron which guides the ears to said rollers and the elevator. The improvement consists in dispensing with the belt 46, and so locating the gears 50 on the husking rollers that a single belt 70 may be employed to drive the gears 50 and likewise the driving gear 47 of the endless apron, the elevator being driven in the manner heretofore described indirectly from the gear 47. In Fig. 8, I have illustrated the application of spring-controlled boxes 71 to the journals of the several husking rollers, whereby they have more or less of a compensating action.

The harvester may be attached to the body of the wagon in any approved manner. In the drawings the attachment consists of bracket arms 66, attached to the elevator and entering eyes or sockets 67, secured to the vehicle body.

Having thus described my invention, I claim as new and desire to secure by Letters Patent—

1. The combination, with a vehicle and a frame attached thereto, the frame being provided with a driving shaft driven from the axle of the vehicle, the said attached frame being a portion of the harvester, and a working frame pivoted within the main frame of the harvester, the said working frame being provided with an open rear end and a slotted and inclined forward end, of spiral rollers located longitudinally over the forward slotted portion of the working frame, held to revolve in said frame, the inner ends of the rollers being their larger ends and made to converge, stripping bars located one over each roller and adapted to have simultaneous movement in opposite directions, a pitman and lever connection between the drive shaft of the harvester and the stripping bars, a driving connection between the drive shaft of the harvester and the rollers of its working frame, devices, substantially as shown and described, for maintaining the working frame at a given angle with reference to the ground, and an elevator adapted to receive the ears of corn from the working frame, as and for the purpose set forth.

2. In a corn harvester, the combination, with a vehicle, and a harvester the main frame of which is adapted for attachment to the vehicle, a drive shaft journaled in the main frame of the harvester and having driving connection with an axle of the vehicle, and a working frame pivoted within the main frame of the harvester, provided with a longitudinal slot at its forward end and with adjusting devices at its rear, the rear portion of the working frame being open, of disks mounted upon the drive shaft, spirally-grooved conical rollers journaled over the opening in the working frame, converging at their inner and larger ends, stripping bars held to reciprocate one over each roller, a lever and pitman connection between each stripping bar and one of the disks, the attachment with the disks being made at opposite sides of their centers, a driving connection between the drive shaft and the rollers, an endless apron located beneath the open end of the working frame of the harvester, a series of husking rollers located adjacent to said apron, substantially parallel therewith, adapted to receive between them and the apron the ears of corn, an elevator located at one side of the main frame, a driving mechanism for the elevator, and a conductor leading from the husking rollers to the elevator, as and for the purpose specified.

WINFIELD S. OSBORN.

Witnesses:
GEORGE A. CHAPPELL,
FRANK E. FISHER.